United States Patent [19]

Mori et al.

[11] 4,252,939
[45] Feb. 24, 1981

[54] METHOD FOR MANUFACTURE OF AROMATIC POLYESTER-POLYCARBONATE

[75] Inventors: Hajime Mori; Katsuhisa Kohyama; Katsuhiko Nakamura, all of Kitakyushu; Katsuyuki Sakata, Nakama, all of Japan

[73] Assignee: Mitsubishi Chemical Industries, Limited, Tokyo, Japan

[21] Appl. No.: 47,796

[22] Filed: Jun. 12, 1979

[30] Foreign Application Priority Data

Aug. 10, 1978 [JP] Japan ................................. 53/97592

[51] Int. Cl.³ ............................................. C08G 63/64
[52] U.S. Cl. .................................. 528/171; 528/179; 528/182; 528/198; 528/199
[58] Field of Search ............... 528/198, 200, 202, 204, 528/171, 199, 182, 179, 191; 260/463

[56] References Cited

U.S. PATENT DOCUMENTS 3,169,121   2/1965   Goldberg .................... 260/47 XA

FOREIGN PATENT DOCUMENTS 47598   7/1973   Japan.

Primary Examiner—Theodore E. Pertilla
Attorney, Agent, or Firm—Oblon, Fisher, Spivak, McClelland & Maier

[57] ABSTRACT

An aromatic polyester-polycarbonate is prepared by (a) forming a low molecular weight polyester oligomer possessing terminal -OH groups by reacting a solution of a terephthaloyl chloride compound in an organic solvent with a dihydroxy-diaryl compound in an aqueous alkaline solution;

(b) reacting said oligomer with phosgene thereby converting said terminal -OH groups to terminal -OCOCl groups; and (c) preparing the desired aromatic polyester-polycarbonate product by polycondensing the product of step (b) with a dihydroxy-diaryl compound in an aqueous alkaline solution.

11 Claims, No Drawings

METHOD FOR MANUFACTURE OF AROMATIC POLYESTER-POLYCARBONATE

BACKGROUND OF THE INVENTION

1. Field of the Invention

This invention relates to a method for the manufacture of an aromatic polyester-polycarbonate. More particularly, this invention relates to an advantageous method for commercially manufacturing an aromatic polyester-polycarbonate which possesses excellent mechanical properties, thermal stability chemical resistance and transparency.

2. Description of the Prior Art

In the past, aromatic polyester-polycarbonates have been prepared by reacting 2,2-bis-(4-hydroxyphenyl)-propane(bis-phenol A) or similar compound with a terephthaloyl chloride compound. It has been suggested that the starting materials should be reacted in a homogeneous system in an organic solvent containing pyridine and then allowing the resultant reaction mixture to undergo polycondensation with phosgene (Japanese Patent Laid-open Publication No. 128992/1977 and Goldberg, U.S. Pat. Nos. 3,030,331 and 3,169,121). By this technique an aromatic polyester-polycarbonate can be obtained which has excellent properties. However, because pyridine is used as an acid acceptor in the reaction, it cannot easily be separated from water because of its high solubility in water and because it possesses a boiling point which approximates the boiling point of water. During the polyester-polycarbonate reaction pyridine reacts with HCl liberated in the reaction and forms pyridine hydrochloride. However, when the hydrochloride is removed by treatment of the solution with aqueous alkali, significant quantities of pyridine are lost. Further, because pyridine has a very strong odor, it is difficult to comfortably work in areas where the reaction is conducted. Thus, this method has not been satisfactory from an industrial point of view. Therefore, a need continues to exist for a method by which aromatic polyester-polycarbonates can be prepared without using an acid acceptor in the reaction medium.

SUMMARY OF THE INVENTION

Accordingly, one object of the present invention is to provide a method of synthesizing an aromatic polyester-polycarbonate which does not entail the use of pyridine as an acid acceptor.

Briefly, this object and other objects of the present invention as hereinafter will become more readily apparent can be attained in a method of preparing an aromatic polyester-polycarbonate by:

(a) forming a low molecular weight polyester oligomer possessing terminal-OH groups by reacting a solution of a terephthaloyl chloride compound in an organic solvent with a dihydroxy-diaryl compound in an aqueous alkaline solution;

(b) reacting said oligomer with phosgene thereby converting said terminal-OH groups to terminal OCOCl groups; and (c) preparing the desired aromatic polyester polycarbonate product by polycondensing the product of step (b) with a dihydroxy-diaryl compound in an aqueous alkaline solution.

DESCRIPTION OF THE PREFERRED EMBODIMENTS

In the experimental work leading to the present invention it was discovered that when an aqueous alkaline solution of a dihydroxy-diaryl compound and an organic-solvent solution of a terephthaloyl chloride compound are mixed in a specific ratio and left to stand and react with each other for a short time, the terephthaloyl chloride undergoes substantially no hydrolysis, despite the generally held view that an acid halide immediately undergoes hydrolysis upon contact with water, but reacts with the alkali salt of bis-phenol A to produce a low molecular weight polyester oligomer possessing a terminal-OH group. The desired aromatic polyester-polycarbonate product possessing excellent properties can then easily be obtained by reacting phosgene with the polyester oligomer, thereby converting the terminal-OH group of the oligomer into an -OCOCl group and subsequently condensing the oligomer with a dihydroxy-diaryl compound in an aqueous alkaline solution.

By the discovery described above, it is now possible to prepare an aromatic polyester-polycarbonate in an industrially advantageous manner without requiring the use of an acid acceptor such as pyridine. The present invention can be accomplished by reacting a dihydroxy-diaryl compound in an aqueous alkaline solution with a terephthaloyl chloride in an organic-solvent solution to produce a low molecular polyester oligomer possessing a terminal-OH group. In the second stage of the process phosgene is reacted with the low molecular polyester oligomer obtained in the first stage to produce a low molecular polyester oligomer possessing a terminal-OCOCl group. In the third stage of the process, an organic-solvent solution of the low molecular weight polyester oligomer obtained in the second state is subjected to polycondensation with an aqueous alkaline solution of a dihydroxy-diaryl compound to form the desired product.

Suitable dihydroxy-diaryl compounds which can be used in the present invention include compounds of the formula:

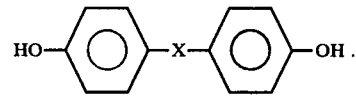

wherein, X is a divalent group such as

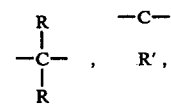

—O—, —S—, —SO— or —SO₂—, and both R groups are the same or different and are a hydrogen atom, a monovalent hydrocarbon radical or a halogen atom, and R' is a divalent hydrocarbon radical. Specific examples of dihydroxy-diaryl compounds include bis-(hydroxy-aryl)-alkanes such as bis-(4-hydroxyphenyl)-methane, 1,1-bis-(4-hydroxyphenyl)-ethane, 2,2-bis-(4-hydroxyphenyl)-propane, 2,2-bis-(4-hydroxyphenyl)-butane, 2,2-bis-(4-hydroxyphenyl)-octane, bis-(4-hydroxyphenyl)-phenyl-methane, 2,2-bis-(4-hydroxy-3-methylphenyl)-propane, 1,1-bis-(4-hydroxy-3-tert.butylphenyl)-propane, 2,2-bis-(4-hydroxy-3-bromophenyl)-propane, 2,2-bis-(4-hydroxy-3,5-dibromophenyl)-propane and 2,2-bis-(4-hydroxy-3,5-dichlorophenyl)-propane; bis-(hydroxyaryl)-cyclo-alkanes such as 1,1-bis-(4-hydroxyphenyl)-cyclo-pentane and 1,1-bis-(4-hydroxyphenyl)-cyclo-hexane; dihydroxy-diaryl ethers such as 4,4'-dihydroxy-diphenyl ether and 4,4'-dihydroxy-3,3'-dimethyldiphenyl ether; dihydroxy-diaryl sulfides such as 4,4'-dihydroxy diphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxy-diaryl sulfones such as 4,4'-dihydroxyphenyl sulfone & 4,4'-dihydroxy-3,3'-dimethylphenyl sulfone.

Suitable alkalis which can be advantageously employed in the preparation of the aqueous alkaline solution of the dihydroxy-diaryl compound mentioned above include caustic alkalis such as sodium hydroxide, potassium hydroxide, and lithium hydroxide. From the commercial point of view, however, it is advantageous to use sodium hydroxide.

With regard to the terephthaloyl chloride reactant of the present process, those terephthaloyl chloride compounds which contain a halogen atom or an alkyl group in their ring structure may be employed. Suitable terephthaloyl chlorides include 2,4-dichloro-terephthaloyl chloride, 2,5-dibromoterephthaloyl chloride, chloro-terephthaloyl chloride, methyl-terephthaloyl chloride and 2,5-dimethyl-terephthaloyl chloride besides terephthaloyl chloride.

For the first stage of the synthesis procedure, the terephthaloyl chloride reactant may be dissolved in any organic solvent which is insoluble in water. Suitable organic solvents which are useful include chlorinated hydrocarbons such as methylene chloride, chloroform, dichloroethane, trichloroethane, tetrachlorethane, 1,2-dichloroethylene and dichlorobenzene. Moreover, mixtures of these chlorinated hydrocarbons with organic solvents such as dioxane, tetrahydrofuran, acetophenone, toluene, xylene, cyclohexane, acetone and n-heptane are also satisfactory as a solvent medium. From the commercial point of view, methylene chloride is a choice solvent.

In the first stage of the synthesis technique of the present invention, an aqueous alkaline solution of a suitable dihydroxy-diaryl compound and an organic-solvent solution of a terephthaloyl chloride are mixed to prepare an ester.

Although the concentration of the dihydroxy-diaryl compound in the aqueous alkaline solution is not critical and can be widely varied, it is desirable to select a concentration in the neighborhood of the point of saturation because the amount of materials employed in the reaction can be minimized which is very desirable from the standpoint of industrial operations. On the other hand, the concentration of the terephthaloyl chloride varies with the kind of solvent being used. When methylene chloride is used as the solvent, for example, it is desirable to vary the concentration in the range of from 1% by weight to the point of saturation, preferably from 2 to 10% by weight.

The mixing ratio of the dihydroxy-diaryl compound relative to the terephthaloyl chloride compound should be such that the dihydroxy-diaryl compound is present in excess amount relative to the terephthaloyl chloride compound. This mixing ratio is desirably selected within the range of 1:0.5–0.75, preferably 1:0.6–0.7. As the proportion of the terephthaloyl chloride approaches one, the oligomer tends to be produced in high molecular weight. As the proportion further increases, it is no longer possible to produce an oligomer which possesses a terminal-OH group, which in turn makes it difficult to produce the aromatic polyester polycarbonate product of the present invention. Conversely when the proportion of the terephthalyol chloride is smaller than the ratio set forth above, the quantities of unreacted dihydroxy-diaryl compound become significantly large such that in the subsequent second stage, the unreacted dihydroxy-diaryl compound reacts with phosgene which gives rise to oligomers of varying molecular weights and oligomers containing no ester bond. The presence of such undesired reaction products is an inconvenience to the effective operation of the present invention.

When the terephthaloyl chloride and dihydroxy-diaryl solutions are mixed, the esterification reaction is preferably conducted over a short period of time. For example, the esterification reaction may be continued with thorough agitation for a period of from five seconds to two minutes, preferably from five seconds to 30 seconds.

If the residence time of the reactants in the reaction vessel is too long, it is possible that the terephthaloyl chloride will undergo hydrolysis or an oligomer of undesirably high molecular weight may be produced. It is, therefore, desirable to maintain suitable control of the reaction time, for instance, by using a mixer such as a packed column, orifice column, multistage column or hollow tube.

During the first stage of the process, the reaction temperature and the reaction pressure are not especially critical. Those conditions generally used for interfacial polymerization are quite satisfactory.

The reaction mixture which is obtained from the first stage esterification reaction is an organic solvent-water type emulsion containing therein a polyester oligomer having a terminal-OH group and a by-product alkali metal chloride.

In the second stage of the method of the present invention, phosgene is reacted with the ester product in the first stage reaction mixture to effect conversion of the terminal-OH group into a -OCOCl group. Desirably the amount of phosgene which is employed in the second stage reaction is such that the combined amount of phosgene and the terephthaloyl chloride compound used in the second stage amounts to a proportion of 1 to 3, preferably 1,25 to 2, based on a unit amount of the dihydroxy-diaryl compound used in the first stage, (molar ratio). If the amount of phosgene employed is too small, the extent of conversion of the terminal-OH group of the oligomer to the -OCOCl group is not as great as is required. Conversely, if the amount of phosgene is too large, although the reaction itself is not obstructed, the amount of unreacted phosgene present increases to such a level that extra process steps must be employed to recover the toxic unreacted phosgene. Another problem which also exists is that there is a distinct possibility of undesirable enhanced decomposition of phosgene.

The reaction in the second stage, similar to that in the first stage described above, is carried out over a sufficiently short period of time. Desirably, the reaction is continued with thorough agitation over a period of from five seconds to two minutes, preferably from five seconds to 30 seconds. Again in the second stage, if the residence time is too long, there is a possibility that the terminal-OH group of the low molecular polyester oligomer produced in the first stage will bind with the chloroformate terminal to produce a high molecular weight oligomer. It is, therefore, desirable, to employ a reaction vessel similar to that used in the first stage and to carry out the phosgenation reaction with a short residence time in order to avoid a noticeable change in the molecular weight of the polyester oligomer which has been produced in the first stage.

The reaction mixture which results from the phosgenation reaction is a mixture of an organic-solvent solution of the polyester oligomer possessing a terminal-OCOCl group and an aqueous solution containing large amounts of a by product alkali metal chloride.

In the third stage of the method of the present invention, a dihydroxy-diaryl compound in an aqueous alkaline solution is reacted in a polycondensation reaction with the reaction mixture from the second stage. The reaction mixture from the second stage may be used in its unmodified form in the third stage. Otherwise, this reaction mixture may be freed from the water phase containing the by-product alkali metal chloride before it is transferred to the third stage.

The dihydroxy-diaryl compound used in the third stage may be similar to or dissimilar to that used in the first stage. The amount of the dihydroxy-diaryl compound used is desirably not less than one equivalent per equivalent of terminal-OCOCl groups in the polyester oligomer obtained from the second stage, and preferably is an amount within the range of from 1.1 to 2 times the amount of polyester oligomer on an equivalent weight basis.

If the amount of dihydroxy-diaryl compound employed is less than an equivalent relative to the polyester oligomer, the polycondensation reaction does not proceed sufficiently. On the other hand, if the amount of the dihydroxy-diaryl compound employed is too large, although the reaction itself is not obstructed, the amount of the unreacted dihydroxy-diaryl compound increases to such a level that additional process steps are necessary to remove the excess compound. This is a significant industrial disadvantage because additional expenses are incurred in the removal process.

Desirably in the polycondensation reaction of the third stage, from 0.001 to 1% by weight of an amine is employed in the reaction as a polymerization catalyst based on the organic-solvent solution. Suitable examples of amines which can be advantageously employed for this purpose include aliphatic tertiary amines such as trimethyl amine, triethyl amine, tri-n-propyl amine and tri-n-butyl amine.

The addition of the polymerization catalyst to the reaction solution may be made at any time prior to the start of the polycondensation reaction. The addition of the polymerization catalyst, during or before the second stage is particularly advantageous, because the catalyst facilities phase separation which occurs subsequent to the second stage for the purpose of removing the aqueous phase.

At the time of the polycondensation reaction, a molecular weight-controlling agent such as phenol, p-tertiary butyl phenol or 2,6-dimethyl phenol can be added to the reaction solution. The particular agent selected depends on the degree of polymerization which the polymer under production is desired to possess. The molecular weight controlling agent can also be added during or before the second stage of the process without incurring any adverse effects.

The polycondensation reaction of the third stage must be conducted under agitated solution conditions for a period of from 30 minutes to several hours. An agitation tank is quite satisfactory as a reaction vessel for this reaction.

The reaction temperature and the reaction pressure in the third stage are not critical. In fact, the reaction conditions generally used for the purpose of interfacial polymerization can be employed in the third stage.

The reaction mixture produced in the polycondensation reaction consists of an organic-solvent solution containing the desired aromatic polyester-polycarbonate product an an aqueous solution containing substantial amounts of by-product alkali metal chloride.

The reaction mixture, either in the presence or absence of the water phase, can be purified by a series of washing steps involving the use of water, followed by washing with an aqueous acidic solution and finally washing with water in the order mentioned. From the resultant refined organic-solvent solution, the aromatic polyester-polycarbonate product can be separated from the organic solvent by distillation of the solvent, by the addition of a product insoluble, reaction solvent soluble solvent to the mixture or by some other conventional technique.

By the process of the present invention, an aromatic polyester-polycarbonate possessing excellent properties including mechanical properties, thermal stability, chemical resistance and transparency and possessing a dihydroxy-diaryl compound residue:terephthalic acid residue:carbonate moiety molar ratio of 1:0.33–0.75:0.-67–0.25, a glass transition point (Tg) of 165° to 195° C., and a terminal carboxyl group content of less than 10 eq/$10^6$ g of polymer can be obtained. The above characteristics are excellent from the commercial point of view.

Having generally described this invention, a further understanding can be obtained by reference to certain specific examples which are provided herein for the purposes of illustration only and are not intended to be limiting unless othewise specified.

As indicated in the working examples, the intrinsic viscosity $[\eta]$ is calculated from the formula, $\eta sp/C = [\eta] + 0.427[\eta]^2 C$., wherein $\eta sp$ is determined at 20° C. in a 0.6 g/dl methylene chloride solution and the glass transition point (Tg) is the value determined by differential thermal analysis. The molar ratio for a composition is determined from the ratio of the peak at 1,740 cm$^{-1}$ in the infrared spectrum for the —COO— group and the peak at 1,770 cm$^{-1}$ for the —OCOO— group.

EXAMPLE 1

A solution of 3 kg of terephthaloyl chloride dissolved in 97 kg of methylene chloride and an aqueous alkaline solution of 6 kg of bis-phenol A dissolved in 40 liters of an aqueous 5% sodium hyroxide solution were prepared.

A methylene chloride solution of terephthaloyl chloride and an aqueous alkaline solution of bis-phenol A at flow rates of 42.0 kg/hr. and 16.2 kg/hr. respectively were fed upwardly through the bottom of a vertical column having an inside diameter of 30 mm, a length of 1.5 m and filled with glass beads 5 mm in diameter. The vertical column was enveloped with a jacket through which cold water at about 20° C. was circulated. Through a branched tube having an inside diameter of 4 mm and opened into the vertical column at a height of 0.75 m from the bottom of the column, was fed phosgene at a flow rate of 0.95 kg/hr. The reaction was continued for about one hour.

The reaction solution obtained was allowed to stand for about ten minutes over which time period the solution separated into a water phase and a methylene chloride phase. The water phase had a pH of 13. Analysis failed to detect any free terephthalic acid in the water phase.

A 250-ml portion of the oligomer-containing methylene chloride phase which separated from the water phase and 0.22 g of p-tert.-butyl phenol were placed into a 1-liter flask. The mixture was vigorously agitated and, at the same time, a solution prepared by dissolving 33.5 g of bis-phenol A in 658 g of an aqueous 2.6% sodium hydroxide solution and 5 ml of an aqueous 2.0% triethylamine solution were added thereto. The polycondensation reaction was then allowed to proceed for one hour. The reaction temperature was 24° to 27° C. The resultant solution was allowed to stand and separate into two phases. The methylene chloride phase containing the polymer was washed first with water, then with an acid and again with water by an ordinary technique. Solvent methylene chloride was evaporated from the washed methylene chloride phase and the resultant polymer mass was dried to afford a white solid polymer.

This polymer was found to possess an intrinsic viscosity $[\eta]$ of 0.81 and a glass transition point (Tg) of 182° C. The polymer was of a structure: bis-phenol A residue:-terephthalic acid residue:carbonate moiety mole ratio of 2.0:0.77:1.23.

EXAMPLE 2

In the same apparatus as used in Example 1, the same methylene chloride solution of a terephthaloyl chloride and the same aqueous bis-phenol A alkaline solution used above were fed upwardly through the column of Example 1 at respective flow rates of 44.2 kg/hr. and 15.9 kg/hr. An aqueous 2% triethylamine solution was also fed upwardly through the bottom of the column at a flow rate of 0.2 kg/hr. When the reaction reached its stationary state, the supply of phosgene through the branched tube disposed about the middle of the column was started at a flow rate of 0.75 kg/hr. Phosgenation was continued for about one hour. The resultant reaction solution immediately separated into a water phase and a methylene chloride phase after the reaction solution was placed in a receptacle. The water phase had a pH of 13. Analysis detected no free terephthalic acid in the water phase.

Into a 1-liter flask were placed a 500-ml portion of the above oligomer-containing methylene chloride phase and 0.44 g of p-tert.-butyl phenol. The resultant mixture was vigorously agitated and, at the same time, 260 g of the same aqueous bis-phenol A alkaline solution as used above and 16 g of an aqueous alkaline 25% sodium hydroxide solution were added thereto. The polycondensation reaction was then allowed to proceed.

The viscosity of the reaction solution increased in about five minutes and remained substantially constant thereafter. In spite of increases in viscosity, agitation was continued for one hour. The reaction ranged from 26° to 29° C.

The resultant reaction solution was washed and the solvent evaporated to yield a polymer mass which was dried by following the procedure of Example 1, to afford a white solid polymer.

This polymer was found to have an intrinsic viscosity $[\eta]$ of 0.70 and a glass transition point (Tg) of 172° C. The polymer was of a structure: bis-phenol A residue:-terephthalic acid residue:carbonate moiety mole ratio of 2.0:0.91:1.09.

EXAMPLE 3

A solution of 5 kg of terephthaloyl chloride dissolved in 95 kg of methylene chloride, a solution of 6 kg of bis-phenol A and a solution of 10.6 g of triethylamine dissolved in 40 liters of an aqueous 5% sodium hydroxide solution were prepared.

The methylene chloride solution of terepthaloyl chloride and the aqueous alkaline solution of bis-phenol A were fed at respective rates of 31.2 kg/hr. and 11.7 kg/hr. through a stainless steel tube 20 m long and having a 4 mm inside diameter. Phosgene was admitted into the reactor at a flow rate of 0.52 kg/hr. through a tube having an inside diameter of 3 mm disposed at a distance of 8 m from the inlet of the reactor. The reaction solution flowing from the reactor immediately separated into two phases after it was deposited into a receptacle. A 250-ml portion of the methylene chloride phase which separated from the water phase was subjected to polycondensation and washing by faithfully following the procedure of Example 1, to afford a white solid polymer. This polymer was found to possess an intrinsic viscosity $[\eta]$ of 0.76 and a glass transition point (Tg) of 181° C. The polymer was of a structure: bis-phenol A residue:terephthalic acid residue:carbonate moiety mole ratio of 2.0:1.14:0.86.

Having now fully described this invention, it will be apparent to one of ordinary skill in the art that many changes and modifications can be made thereto without departing from the spirit and scope of the invention set forth herein.

What is claimed as new and intended to be covered by Letters Patent is:

1. A method for manufacturing an aromatic polyester-polycarbonate, comprising:
    (a) forming a low molecular weight polyester oligomer possessing terminal-OH group by reacting a solution of a terephthaloyl chloride compound in an organic solvent with a dihydroxy-diaryl compound in an aqueous alkaline solution over a time period of 5 seconds to 2 minutes, the amount of said terephthaloyl chloride compound ranging from 0.5 to 0.75 moles per mole of said dihydroxy-diaryl compound;
    (b) reacting said oligomer with phosgene therby converting said terminal-OH groups to terminal-OCOCl groups; and
    (c) preparing the desired aromatic polyester-polycarbonate product by polycondensing the product of step (b) with a dihydroxy-diaryl compound in an aqueous alkaline solution.

2. The method of claim 1, wherein in step (b) the amount of the phosgene is such that the total amount of the phosgene and the terephthaloyl chloride compound ranges from 1 to 3, on a mole ratio basis, relative to the molar amount of the dihydroxy-diaryl compound in step (a).

3. The method of claim 1, wherein in step (c) the amount of said dihydroxy-diaryl compound reacted with the product of step (b) ranges from 1.1 to 2 equivalents per equivalent of terminal-OCOCl groups in the oligomer.

4. The method of claim 1, wherein said terephthaloyl compound is 2,4-dichloro-terephthaloyl chloride, 2,5-dibromoterephthaloyl chloride, chloro-terephthaloyl chloride, methylterephthaloyl chloride, 2,5-dimethyl-terephthaloyl chloride or terephthaloyl chloride.

5. The method of claim 1, wherein said organic solvent is a chlorinated hydrocarbon or a chlorinated hydrocarbon in admixture with dioxane, tetrahydrofuran, acetophenone, toluene, xylene, cyclohexane, acetone or n-heptane.

6. The method of claim 1, wherein the mole ratio of said terephthaloyl chloride compound to said dihydroxy-diaryl compound ranges from 1:0.6–0.7.

7. The method of claim 1, wherein in step (c) said polycondensation is conducted in the presence of an amine catalyst.

8. The method of claim 7, wherein said amine is trimethylamine, triethylamine, tri-n-propyl-amine and tri-n-butylamine.

9. The method of claim 1, wherein said aromatic polyester-polycarbonate product is obtained by:
   (1) washing the reaction mixture of step (c) with water;
   (2) washing said water washed solution with an aqueous acidic solution;
   (3) washing said acid washed solution with water; and
   (4) removing solvent from said second water washed solution.

10. The method of claim 1, wherein said dihydroxydiaryl compound has the formula:

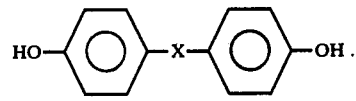

wherein X is a divalent radical selected from the group consisting of

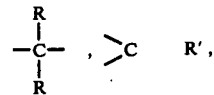

—O—, —S—, —SO— and —SO$_2$—, wherein both R groups are the same or different and are hydrogen, halogen or a monovalent hydrocarbon radical and R' is a divalent hydrocarbon radical.

11. The method of claim 1, wherein said dihydroxydiaryl compound is a bis-(hydroxy-aryl)-alkane, a bis-(hyroxyaryl)-cyclo-alkane, a dihydroxy-diaryl ether, dihydroxy-diarylsulfide, a dihydroxy-diaryl sulfoxide or a dihydroxy-diaryl sulfone.

* * * * *